R. A. MACK.
COMBINATION VEHICLE.
APPLICATION FILED JUNE 26, 1919.

1,386,346.

Patented Aug. 2, 1921.
3 SHEETS—SHEET 1.

Inventor
Rudolph A. Mack,
By C. C. Hines
Attorney

R. A. MACK.
COMBINATION VEHICLE.
APPLICATION FILED JUNE 26, 1919.

1,386,346.

Patented Aug. 2, 1921.
3 SHEETS—SHEET 2.

Inventor
Rudolph A. Mack.

By C. A. Hines,
Attorney

R. A. MACK.
COMBINATION VEHICLE.
APPLICATION FILED JUNE 26, 1919.

1,386,346.

Patented Aug. 2, 1921.
3 SHEETS—SHEET 3.

Inventor
Rudolph A. Mack,
By C. C. Hines,
Attorney

UNITED STATES PATENT OFFICE.

RUDOLPH A. MACK, OF GALLIPOLIS, OHIO.

COMBINATION-VEHICLE.

1,386,346.	Specification of Letters Patent.	Patented Aug. 2, 1921.

Application filed June 26, 1919. Serial No. 306,941.

*To all whom it may concern:*

Be it known that I, RUDOLPH A. MACK, a citizen of the United States, residing at Gallipolis, in the county of Gallia and State of Ohio, have invented new and useful Improvements in Combination-Vehicles, of which the following is a specification.

This invention relates to combination vehicles, and has for its primary object to provide toy vehicles capable of assuming a variety of forms, and which may be easily and quickly converted from one type of vehicle into any one of the forms of which the device is susceptible.

A further object of the invention is to provide a vehicle of the character stated which is constructed in such manner that the child itself may convert the device into the different forms of which the vehicle is susceptible, thus, in addition to providing a conveyance which will prove amusing and entertaining to the child, instructs the latter in the operation and construction of mechanical devices.

A still further object of the invention is to provide a vehicle which may be readily changed from a wheeled vehicle to a sled to travel upon snow or ice, or vice versa, which is equipped with means of an improved and simplified nature for supporting the vehicle, either when being used as a sled or a wheeled vehicle, and which is provided with power devices operated by the limbs of the occupant of the vehicle for propelling the latter when used as a wheeled vehicle.

A still further object of the invention is to provide a vehicle of the character stated embodying seats and changeable bodies, which is constructed so as to enable the bodies and seats to be easily and quickly interchanged, so that the vehicle may take on various vehicle forms and may be made to accommodate different numbers of persons.

The invention aims further to provide a vehicle of the class described, which, while embodying a number of different forms, is composed of comparatively few simple, inexpensive, and readily assembled parts, the various parts being so constructed and arranged as to be capable of being easily applied to or removed from the vehicle frame, certain of the parts being interchangeable thereon, which has power mechanism and steering apparatus of such character as to be readily connected with or disengaged from the drive and steering axles respectively of the vehicle, and which has its various parts constructed and arranged in such manner as to minimize the opportunity for breakage or derangement.

With these objects in view, together with others which will appear as the description proceeds, the invention consists in the novel combination, construction and arrangement of parts, all as will be described more fully hereinafter, illustrated in the drawings, and particularly pointed out in the claims.

In the drawings:—

Figure 1 is a side elevation of a combination of vehicle of the wheeled type disclosing the invention, this type of vehicle simulating a runabout motor car, Fig. 2 is a longitudinal sectional view taken through this type of vehicle, Fig. 3 is an enlarged transverse sectional view illustrating the rear axle of the vehicle, Fig. 4 is a horizontal section taken substantially on line 4—4 of Fig. 1, Fig. 5 is a sectional view illustrating the pedal cranks for operating the vehicle, Fig. 6 is a transverse sectional view showing the mounting of the front axle, Fig. 7 is a side elevation of a changed form of vehicle, the same representing what is generally known as the "Irish mail,"

Figure 1:
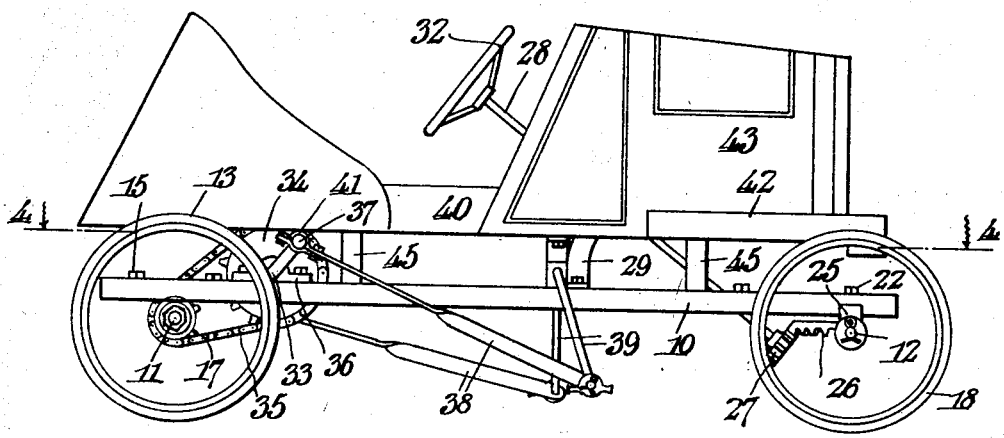
Figure 2:
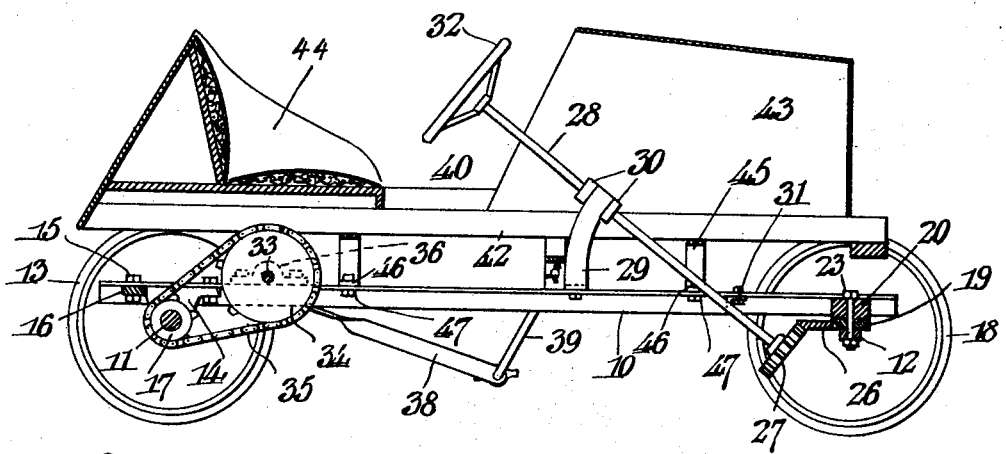
Figure 3:
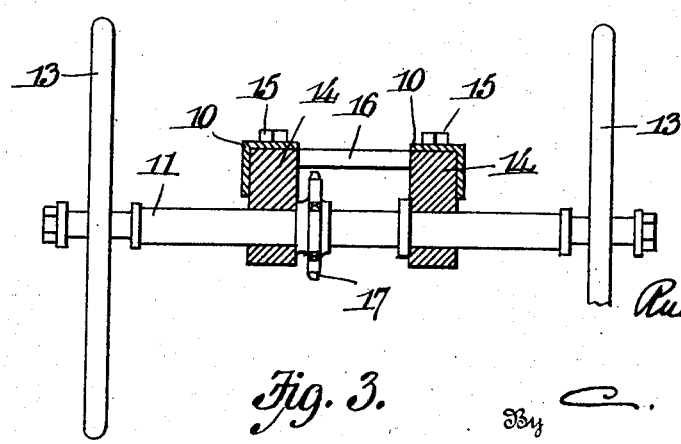
Figure 4:
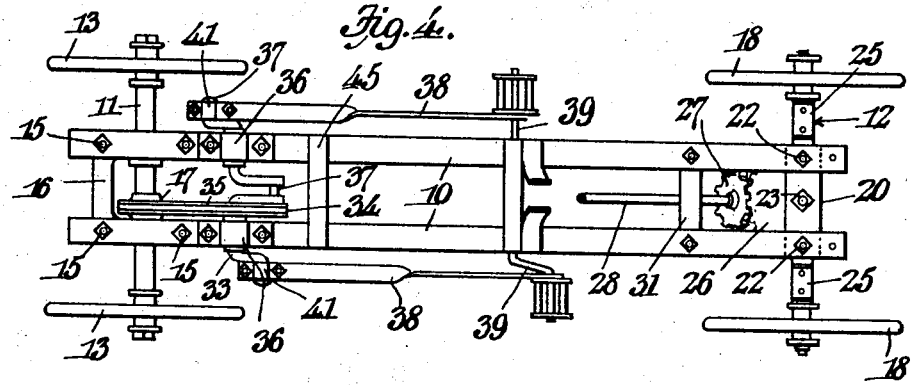
Figures 5, 6:
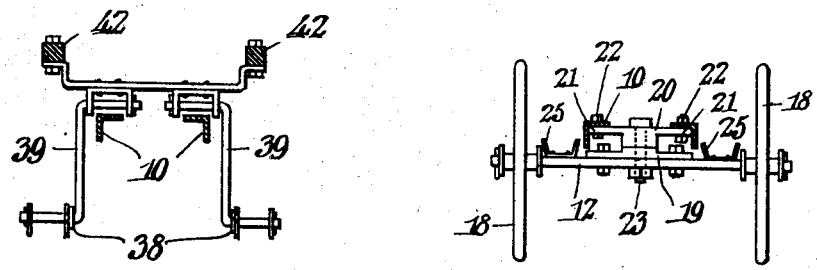

The invention consists essentially in a frame comprising a part of the chassis of the vehicle, to which a number of bodies or seats may be applied, and which may be supported either by wheels or sled runners. The bars constituting this frame are indicated at 10, and comprise angle bars as shown. These angle bars are straight throughout their lengths and are arranged in spaced parallel relation, being detachably connected together and rigidly held as a unit by the devices and elements to be hereafter detailed.

*The wheeled vehicles.*

In using the device as a wheeled vehicle, rear (driving) and front (steering) axles 11 and 12, respectively, are provided. The rear axle is disposed beneath the frame bars 10 and transversely of the latter, and wheels 13 are affixed to the spindles thereof. This axle is rotatably mounted in bearing blocks 14 spaced apart a distance substantially equal to the distance between the spaced parallel bars 10, and these blocks fit beneath the said bars and are bolted thereto as at 15. These blocks at their rear ends are connected together by a tie plate 16, the latter being preferably formed integral with the bearing blocks, but it will be understood that the tie plate may be separate from the blocks and may be bolted or riveted to the latter as desired. The axle 11 is provided intermediate its ends with a gear or sprocket 17, the latter being disposed between the bars 10 of the frame. The bearing blocks 14 and tie plate 16 thus, in addition to firmly supporting the axle 11, securely hold the bars 10 in proper spaced relation at their rear ends.

The front axle 12 is preferably of a length equal to that of the rear axle, and its spindles rotatably support the front or steering wheels 18. This front axle has arranged intermediate its ends and upon its upper side a wear plate constituting a fifth wheel 19, which may be cast with or welded to the axle or may be bolted thereto as desired. This fifth wheel bears against a plate 20 affixed to the forward ends of the spaced bars 10, and this plate may be provided with the projections 21 to engage beneath the angle bars 10 and to be bolted thereto as at 22. The plate and its projections thus form a firm support for the fifth wheel of the steering axle and also rigidly maintain the forward ends of the frame bars 10 in proper spaced relation. A king bolt 23 passes through alined openings in the fifth wheel 19 and plate 20 to rotatably support the steering axle upon the said plate. The front axle is provided inwardly from its ends with eyes 24 to enable a draft tongue or shafts to be applied to the axle, and the axle is also provided upon its upper surface and adjacent to the eyes with foot plates 25 for the occupant of the vehicle when in some of its forms to rest his feet and to steer the vehicle.

In some of the forms of the invention the vehicle is to be steered by a suitable steering apparatus, and this apparatus is supported by the vehicle frame and is operatively connected with the oscillatable front axle. For the accomplishment of this purpose, the front axle is provided with a rack or segment 26, the latter being bolted to the axle as shown and projecting from the rear side thereof. This segment is engaged by a pinion or gear 27 affixed to the lower or forward end of a steering post 28. The steering post extends rearwardly from the front axle and is inclined upwardly, and is rotatably supported upon the vehicle frame by the bracket 29. The bracket comprises a strap iron arranged in the manner shown, the legs of which are bolted to the opposing frame bars 10, whereby the said bracket performs the two-fold function of supporting the steering post and assisting in maintaining the frame bars properly spaced apart. The steering post is provided with collars 30 arranged one upon each side of the supporting bracket 29, whereby the post is prevented from moving longitudinally within the bracket. The steering post is prevented from moving laterally near its forward or lower end by a connecting plate 31 for the frame bars 10, and this plate is provided with a notch in its lower side as shown to snugly receive the said steering post. The upper or rear end of the steering post is provided with the steering wheel 32.

In those forms of vehicles wherein it is desired to use the steering apparatus operable from the interior of the vehicle, the post 28 is arranged rotatably within the bracket 29 and within the notch of connecting plate 31, and the collars 30 hold the post against longitudinal movement. Set screws or pins may be provided to hold the collars in proper assembled position. The pinion or gear 27 at the lower end of the steering post is in mesh with the rack segment 26, and it is obvious, therefore, that rotative movement applied to the steering post will cause the axle to be oscillated, dependent upon the direction of rotation of the steering post. This particular arrangement and construction of steering apparatus enables the latter to be easily and quickly applied to and removed from the vehicle.

In some instances where the device is used as a wheeled vehicle, it is desired to enable the vehicle to be operable by the occupant thereof, the propelling force being applied to the rear or drive axle. To accomplish this result a transmission shaft 33 is provided, the same being disposed transversely of the supporting frame near the rear end thereof and in advance of the axle 11. The transmission shaft is adapted to impart power to the drive axle, and means of any preferred nature may be employed for establishing the power connection between the transmission shaft and the said axle. If desired, intermeshing gears upon the axle and transmission shaft may be employed, or the power connection may be made by means of sprockets and chain as shown. The transmission shaft is provided with a sprocket gear 34, disposed between the bars 10 and longitudinally alined with the gear or sprocket 17 affixed to axle 11, and a sprocket chain 35 passes over these alined sprocket gears as shown. The transmission shaft is mounted in bearings 36 bolted or in any other manner removably applied to the bars of the frame, and the said shaft is provided with crank portions 37. It is obvious, therefore, that rotative movement applied to the transmission shaft through the instrumentality of the cranks 37 will cause the rear axle 11 to be rotated.

In Figs. 1 to 5 inclusive of the drawings I have shown the vehicle as simulating an automobile runabout, and in such instance the cranks 37 will be connected by means of links or pitmen 38 with the lower ends of the pedal lever 39 pivoted upon and depending from the body 40 of the automobile. The pedals are pivotally secured to the automobile body in the brackets shown and are to form a permanent part of the said automobile body. The rear ends of the links 38 are detachably secured to the crank portions 37 of the transmission shaft by means of the keepers 41, and it is obvious from this construction that the pitmen may be easily connected to or removed from the cranks when desired.

The body 40 includes the base portion 42, to the forward end of which is secured the hood or imitation engine cover 43, while the seat for the occupant of the vehicle is indicated at 44. This base portion is cut away between the seat and the under part of the hood 43 to permit of the legs of the occupant extending through the same so that the feet may rest upon the pedals. This open part of the base also permits of the body being passed over the steering post and guide wheel of the vehicle. The body is secured to the frame bars 10 by means of the metallic spring members 45. These spring members are substantially inverted U-shape, being secured at their bight portions to the base of the body and having inturned feet 46 at the end of said members resting upon the horizontally disposed portions of the frame bars. Bolts 47 may be passed through these feet and through the angle irons constituting the bars 10 to rigidly and yet detachably secure the body to the chassis. The body while being firmly held upon the chassis, is spaced a suitable distance above the chassis so as not to interfere with the operation of any of the driving apparatus, and the members 45 yieldably support the body in proper position.

Figure 7:
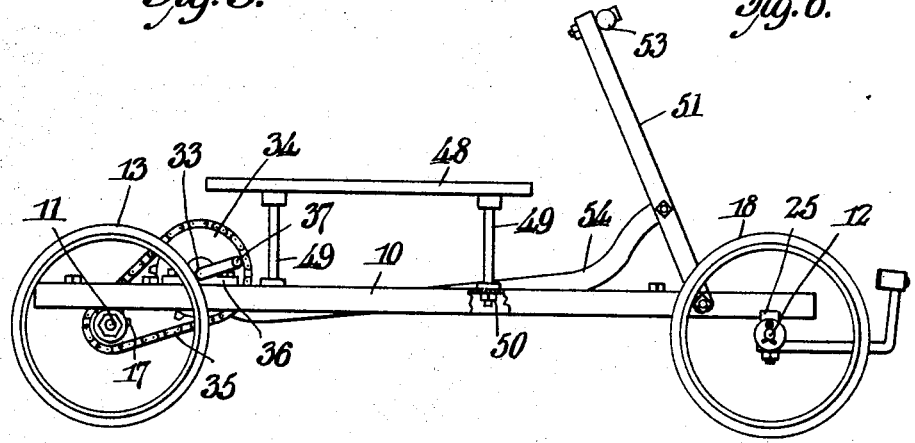

In Fig. 7 of the drawings there is illustrated the type of vehicle in which the seat for the occupant is indicated at 48, and comprises a board structure of suitable length and breadth mounted upon and spaced above the frame members of the chassis. This seat has depending therefrom the spaced supports 49. which carry shoulders to rest upon the angle bars, and the lower ends of these members protrude through openings in the said angle bars; nuts 50 being applied to the protruding lower ends of the said members to hold the seat firmly in position. The pedal mechanism is dispensed with in this form of vehicle, and the device is propelled by swinging the propelling lever 51 back and forth. This lever is pivoted between the bars 10 at its lower end, and is provided at its upper end with a handle bar 53. A link 54 connects the lever with one of the cranks 37 on the transmission shaft 33, and it is obvious from this construction that reciprocating movement developed in the lever 51 will cause the driving apparatus to operate. The steering post and wheel in this form of the invention is eliminated, and the occupant of the vehicle steers the latter by placing his feet in the foot plates 25 upon the front axle.

Figure 8:
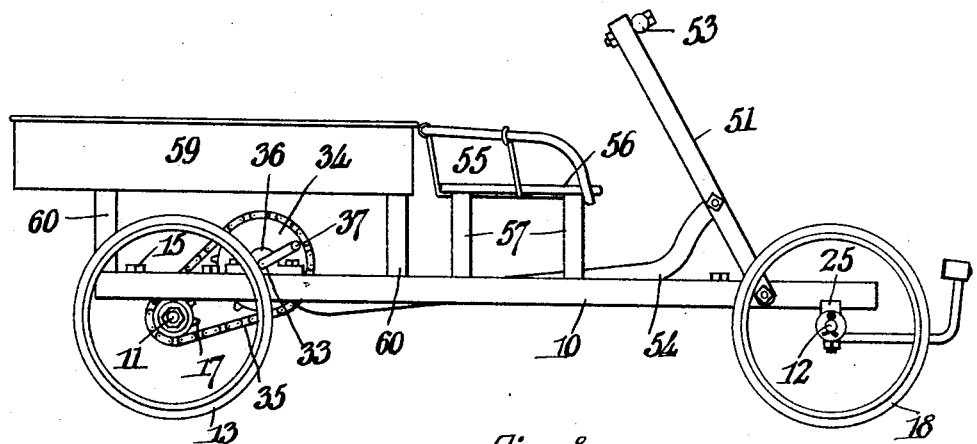
Fig. 8 is a modified form of vehicle.

In Fig. 8 of the drawings there is a slightly changed form of vehicle, the change residing merely in the seat and body members supported by the frame bars. In this form of the invention an individual seat 55 is used, being positioned upon the frame in a place which will allow the occupant to conveniently reach and operate the lever 51. This seat comprises a base 56 having secured to the underside thereof the spaced inverted U-shaped members 57 which have feet 58 at their lower ends resting upon the upper surfaces of the angle bars 10. Bolts may be passed through registering openings in the feet 58 and the angle bars to firmly hold the seat properly positioned upon the frame. The frame has also arranged thereon a wagon body indicated at 59, which has upon the under face thereof the downwardly extending leg portions 60 of inverted U members, the feet at the lower ends of said members resting upon and being secured to the angle bars 10. The vehicle in this form is steered by placing the feet upon the stirrups or foot plates 25 on the front axle, while motive power is developed by reciprocating the lever 51.

Figure 9:
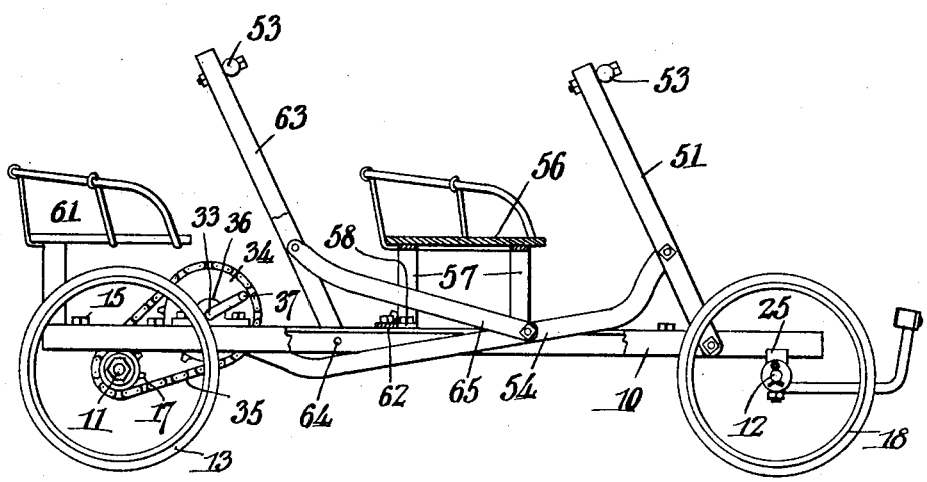
Fig. 9 is a further modification.

Fig. 9 of the drawings shows a further form of the invention, wherein a power tandem runabout is provided. The construction of the device in this form is similar to that shown in Fig. 8 excepting that the body 59 is omitted, and a second seat is substituted therefor, the vehicle also providing means whereby the occupant of this second seat may assist in developing propelling power. The seat 61 is similar to the seat 55 above described, and is arranged at or near the extreme rear end of the chassis. The occupant of this second seat may rest his feet in the stirrup or plate 62 secured upon and extending transversely of the frame. The lever 63 is pivoted to the frame as at 64, within convenient reach of the occupant of the second seat, and this lever is connected with the links 54 by means of a second link or pitman 65. It is obvious, therefore, that the occupants of both seats of the vehicle in this form of the invention may contribute to the propulsion of the vehicle, as the power developed in lever 63 is transmitted to the link 54 by means of the pitman 65. As in the form shown in Fig. 8, the vehicle is steered by the feet of the occupant of the front seat of the vehicle.

From the foregoing it is obvious that I have provided vehicle structure capable of a variety of changes in form, all of which changes may be readily made by a child of ordinary intelligence and without the use of special skill or tools. The changes from one form of vehicle to the other may be quickly made, and the simplicity of the construction of the various movable parts enables the various structures to be completed without danger of confusion or breakage or distortion of any of such parts.

While the above is a description of the preferred embodiment of the invention, it is to be understood that variations may be made in the minor details without departing from the invention as defined by the claims.

Having thus fully described my invention, I claim:—

1. In a device of the class described, a frame, drive and steering axles on said frame, a transmission shaft on said frame, cranks on said shaft, one of said cranks being disposed inwardly from the ends of the shaft and in the longitudinal center of the frame, the other of said cranks being located at the ends of said shaft, said central and end cranks adapted selectively to be engaged with different types of propelling apparatus, and a gear on said shaft operatively connected with said drive axle.

2. In a device of the class described, a frame, drive and steering axles on said frame, a transmission shaft carried by said frame and disposed transversely thereof, a crank on said shaft inwardly from the ends thereof and disposed in the longitudinal center of said frame, cranks at the ends of said shaft disposed outwardly beyond the outer sides of said frame, the said central and end cranks adapted for engagement with different types of propelling apparatus, and a gear on said shaft operatively connected with said drive axle.

3. In a device of the class described, a main frame, a drive axle on said main frame, a transmission shaft on said main frame, a central crank on said shaft, end cranks on said shaft, a gear on said shaft operatively connected with said drive axle, a body frame supported on said main frame, and interchangeable propelling means adapted to be operatively connected with the central crank or the end cranks of said transmission shaft.

4. In a device of the class described, a main frame, drive and steering axles on said main frame, a transmission shaft on said main frame, end cranks on said shaft, a gear on said shaft and operatively connected with said drive axle, a body frame overlying said main frame and detachably mounted thereon, propelling means carried on said body frame and operatively connected with the end cranks on said transmission shaft, and a central crank on the transmission shaft adapted to be operatively connected with a different propelling means, the frame being adapted to receive and support said separate propelling means.

5. In a device of the class described, a main frame, drive and steering axles on said main frame, a transmission shaft on said main frame, end cranks on said shaft, a gear on said shaft and operatively connected with said drive axle, a body frame overlying said main frame and supported thereby in spaced relation thereto, hangers depending from the body frame, levers pivoted to said hangers and depending at the sides of the main frames, and links connecting said levers with the end cranks on said transmission shaft.

6. In a device of the class described, a main frame, drive and steering axles on said main frame, a transmission shaft on said main frame, end cranks on said shaft, a gear on said shaft and operatively connected with said axle, a body frame overlying said main frame, resilient means for supporting said body frame above and in spaced relation to said main frame, hangers depending from the body frame, levers pivoted to said hangers and depending at the sides of the main frames, and links connecting said levers with the end cranks on said transmission shaft.

7. In an occupant-propelled vehicle, a main frame, a drive axle carried by said frame, a transmission axle on said main frame operatively connected with said drive axle, the said main frame having means for the attachment of different interchangeable bodies thereto, and means whereby different types of driving mechanism including a prime mover interchangeable for mounting upon either the said main frame, or the said body structure mounted thereon, may be operatively connected with said transmission axle.

8. In an occupant-propelled vehicle, a main frame, a body detachably mounted on the main frame, said main frame having means for the attachment of different interchangeable bodies thereto, an axle carried by the main frame, and propelling mechanism for imparting motion to said axle, the main frame and axle having means for connection therewith of different interchangeable forms of propelling mechanisms associated with the axle and including means for supporting a prime mover of the propelling mechanism upon the main frame or body.

9. In a child's convertible type occupant-propelled vehicle, a main frame including spaced frame bars, geared drive and transmission shafts at the rear of the main frame, said transmission shaft having a central crank on a line between the frame bars and end cranks extending outwardly beyond said bars, supporting and steering devices at the front of the frame, the latter having means for the application of different interchangeable supporting and steering devices thereto, a body supported upon the main frame, the latter having means for the application of different forms of interchangeable bodies thereto, and suitable propelling means for connection with the transmission shaft, the main frame and body having means for the attachment of different interchangeable propelling devices for driving connection with either the end cranks or the central crank of the transmission shaft.

In testimony whereof I affix my signature.

RUDOLPH A. MACK.